United States Patent
Prunean (10) Patent No.: US 10,432,447 B2
(45) Date of Patent: Oct. 1, 2019

(54) SYSTEM AND METHOD FOR AMPLITUDE PRE-DISTORTION OPTIMIZATION FOR GPS SIGNAL CONSTANT ENVELOPE TRANSMISSION

(71) Applicant: The Boeing Company, Chicago, IL (US)

(72) Inventor: Cornel Prunean, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 47 days.

(21) Appl. No.: 15/809,923

(22) Filed: Nov. 10, 2017

(65) Prior Publication Data

US 2019/0149392 A1 May 16, 2019

(51) Int. Cl.
| | |
|---|---|
| H04L 27/36 | (2006.01) |
| H04J 13/00 | (2011.01) |
| H04B 1/707 | (2011.01) |
| G01S 19/13 | (2010.01) |
| H04B 1/04 | (2006.01) |

(52) U.S. Cl.
CPC .......... H04L 27/367 (2013.01); H04B 1/707 (2013.01); H04J 13/0029 (2013.01); H04L 27/361 (2013.01); *G01S 19/13* (2013.01); *H04B 1/0475* (2013.01); *H04B 2001/0491* (2013.01)

(58) Field of Classification Search
CPC .. H04L 27/367; H04L 27/361; H04J 13/0029; H04B 1/707; H04B 2001/0491; H04B 1/0475; G01S 19/13
See application file for complete search history.

(56) References Cited

U.S. PATENT DOCUMENTS

| | | |
|---|---|---|
| 5,771,461 A | 6/1998 | Love et al. |
| 6,430,213 B1 | 8/2002 | Dafesh |
| 7,120,198 B1 | 10/2006 | Dafesh et al. |
| 7,791,534 B1 | 9/2010 | Zhi et al. |
| 8,111,735 B2 | 2/2012 | Chen |
| 8,976,891 B2 | 3/2015 | Pratt et al. |
| 9,432,110 B2 | 8/2016 | Prunean |
| 2001/0027090 A1 | 10/2001 | Uesugi |

(Continued)

OTHER PUBLICATIONS

Zhang et al., "Implementations of Constant Envelope Multiplexing Based on Extended Interplex and Inter-Modulation Construction Method," Proceedings of the 25th International Technical Meeting of the Satellite Division of the Institute of Navigation, Sep. 21, 2012, 8 pages.

(Continued)

Primary Examiner — Ajay Cattungal
(74) Attorney, Agent, or Firm — Kolisch Hartwell, P.C.

(57) ABSTRACT

A system and method include a modulator configured to combine satellite codes with carrier signals on an in-phase channel and a quadrature-phase channel to produce I-channel and Q-channel signal components. The powers of the combined satellite codes are selected according to desired code power fractions. A processor pre-distorts the signal components such that they can be transmitted as a unit-amplitude constant envelope transmission that preserves the desired code power fractions. The pre-distortion may also account for data filtering effects that tend to distort the code power fractions.

19 Claims, 5 Drawing Sheets

(56) References Cited

U.S. PATENT DOCUMENTS

| | | | | |
|---|---|---|---|---|
| 2005/0220003 A1* | 10/2005 | Palaskas | ............... | H04B 1/30 370/210 |
| 2008/0143562 A1* | 6/2008 | Huang | ............... | H04L 27/364 341/118 |
| 2010/0034313 A1 | 2/2010 | Benavides | | |
| 2010/0232493 A1* | 9/2010 | Thirumoorthy | ..... | H04L 27/0014 375/232 |
| 2011/0044398 A1 | 2/2011 | Dowling et al. | | |
| 2011/0051783 A1 | 3/2011 | Cahn et al. | | |
| 2011/0110218 A1* | 5/2011 | Park | ............... | H04J 13/0048 370/209 |
| 2012/0064847 A1* | 3/2012 | Xu | ............... | H04B 1/0475 455/114.3 |
| 2013/0044836 A1* | 2/2013 | Koren | ............... | H03F 1/3247 375/297 |
| 2013/0113559 A1* | 5/2013 | Koren | ............... | H03F 1/0222 330/149 |
| 2013/0208767 A1 | 8/2013 | Prunean | | |
| 2013/0293421 A1 | 11/2013 | Bartone | | |
| 2014/0104103 A1 | 4/2014 | Enge et al. | | |
| 2014/0300426 A1* | 10/2014 | Mu | ............... | H04L 27/362 332/103 |
| 2016/0285506 A1* | 9/2016 | Yao | ............... | H04B 1/707 |

OTHER PUBLICATIONS

Zhou et al., "CS-POCET: A Dual-frequency Constant Envelope Multiplex Method for GNSS Signal," Proceedings of 2014 International Technical Meeting of the Institute of Navigation, Jan. 29, 2014, pp. 835-843.

European Patent Office, Extended European Search Report regarding European Patent Application No. 15166748.2, dated Sep. 4, 2015, 8 pages.

U.S. Patent and Trademark Office, Office action in U.S. Appl. No. 14/271,670, dated Sep. 15, 2015, 18 pages.

* cited by examiner

| M | P | C/A | L1Cp | L1Cd | Phi | I | Q |
|---|---|---|---|---|---|---|---|
| 1 | 1 | 1 | 1 | 1 | 56.22 | 0.5560 | 0.8312 |
| 1 | 1 | 1 | 1 | -1 | 58.22 | 0.5266 | 0.8501 |
| 1 | 1 | 1 | -1 | 1 | 87.80 | 0.0384 | 0.9993 |
| 1 | 1 | 1 | -1 | -1 | 91.62 | -0.0282 | 0.9996 |
| 1 | 1 | -1 | 1 | 1 | 88.38 | 0.0282 | 0.9996 |
| 1 | 1 | -1 | 1 | -1 | 92.20 | -0.0384 | 0.9993 |
| 1 | 1 | -1 | -1 | 1 | 121.78 | -0.5266 | 0.8501 |
| 1 | 1 | -1 | -1 | -1 | 123.78 | -0.5560 | 0.8312 |
| 1 | -1 | 1 | 1 | 1 | -3.34 | 0.9983 | -0.0582 |
| 1 | -1 | 1 | 1 | -1 | 0.35 | 1.0000 | 0.0060 |
| 1 | -1 | 1 | -1 | 1 | 79.46 | 0.1829 | 0.9831 |
| 1 | -1 | 1 | -1 | -1 | 135.29 | -0.7107 | 0.7035 |
| 1 | -1 | -1 | 1 | 1 | 44.71 | 0.7107 | 0.7035 |
| 1 | -1 | -1 | 1 | -1 | 100.54 | -0.1829 | 0.9831 |
| 1 | -1 | -1 | -1 | 1 | 179.65 | -1.0000 | 0.0060 |
| 1 | -1 | -1 | -1 | -1 | -176.66 | -0.9983 | -0.0582 |
| -1 | 1 | 1 | 1 | 1 | 3.34 | 0.9983 | 0.0582 |
| -1 | 1 | 1 | 1 | -1 | -0.35 | 1.0000 | -0.0060 |
| -1 | 1 | 1 | -1 | 1 | -79.46 | 0.1829 | -0.9831 |
| -1 | 1 | 1 | -1 | -1 | -135.29 | -0.7107 | -0.7035 |
| -1 | 1 | -1 | 1 | 1 | -44.71 | 0.7107 | -0.7035 |
| -1 | 1 | -1 | 1 | -1 | -100.54 | -0.1829 | -0.9831 |
| -1 | 1 | -1 | -1 | 1 | -179.65 | -1.0000 | -0.0060 |
| -1 | 1 | -1 | -1 | -1 | 176.66 | -0.9983 | 0.0582 |
| -1 | -1 | 1 | 1 | 1 | -56.22 | 0.5560 | -0.8312 |
| -1 | -1 | 1 | 1 | -1 | -58.22 | 0.5266 | -0.8501 |
| -1 | -1 | 1 | -1 | 1 | -87.80 | 0.0384 | -0.9993 |
| -1 | -1 | 1 | -1 | -1 | -91.62 | -0.0282 | -0.9996 |
| -1 | -1 | -1 | 1 | 1 | -88.38 | 0.0282 | -0.9996 |
| -1 | -1 | -1 | 1 | -1 | -92.20 | -0.0384 | -0.9993 |
| -1 | -1 | -1 | -1 | 1 | -121.78 | -0.5266 | -0.8501 |
| -1 | -1 | -1 | -1 | -1 | -123.78 | -0.5560 | -0.8312 |

SYSTEM AND METHOD FOR AMPLITUDE PRE-DISTORTION OPTIMIZATION FOR GPS SIGNAL CONSTANT ENVELOPE TRANSMISSION

CROSS-REFERENCES

The following patent is incorporated by reference herein, in its entirety, for all purposes: U.S. Pat. No. 9,432,110 B2.

FIELD

This disclosure relates to systems and methods for code multiplexing. More specifically, the disclosed embodiments relate to code multiplexing with constant envelope transmission using amplitude pre-distortion.

BACKGROUND

The Global Positioning System (GPS) is a satellite-based navigation system made up of a network of satellites in orbit. GPS satellites circle the earth in a precise orbit and transmit signal information to earth. GPS receivers take the signal information and use triangulation to calculate the receiver's location. The GPS receiver can compare the time a signal was transmitted by a satellite with the time it was received. The time difference tells the GPS receiver how far away the satellite is. With distance measured from several satellites, the receiver can determine its position and display it to a user. Once the receiver's position has been determined, a GPS device can calculate other information, such as speed, bearing, track, trip distance, distance to destination, sunrise and sunset time, and more.

Signals transmitted by a GPS satellite include satellite codes used by GPS receivers. Ideally, the satellite code signals are adjusted to obtain code power fractions, i.e., respective fractions of the signal power used to transmit each code, optimized such that the absolute power level of each code meets GPS standards and the combined codes are transmitted in a constant envelope signal requiring as little power as possible. One method directed to this optimized code multiplexing is channel amplitude optimized constant envelope transmission (CAOCET), as disclosed in U.S. Pat. No. 9,432,110 B2. In the CAOCET method, satellite codes are linearly combined in an in-phase channel and a quadrature-phase channel and then projected onto a unit circle to produce a signal with constant, unit amplitude. However, the projection distorts the original code power fractions. Therefore, a method of code multiplexing that accounts for this distortion could improve GPS satellite code transmission.

SUMMARY

The present disclosure provides systems and methods relating to amplitude pre-distortion for constant envelope transmission (APCET) for multiplexing satellite codes associated with the Global Positioning System (GPS) or other global navigation satellite systems. In existing systems for satellite code multiplexing, code power fractions are distorted when codes multiplexed linearly on two substantially orthogonal channels are projected onto a unit circle. The APCET system solves this problem by pre-distorting the amplitudes and/or phases of the signal components in each orthogonal channel prior to projection such that after projection, the desired code power fractions are achieved. The APCET system thus enables constant envelope transmission of the multiplexed code signal without excessive transmission power, while still providing each individual code at or above the standard-specified power level.

Features, functions, and advantages may be achieved independently in various embodiments of the present disclosure, or may be combined in yet other embodiments, further details of which can be seen with reference to the following description and drawings.

DESCRIPTION

Figure 1:
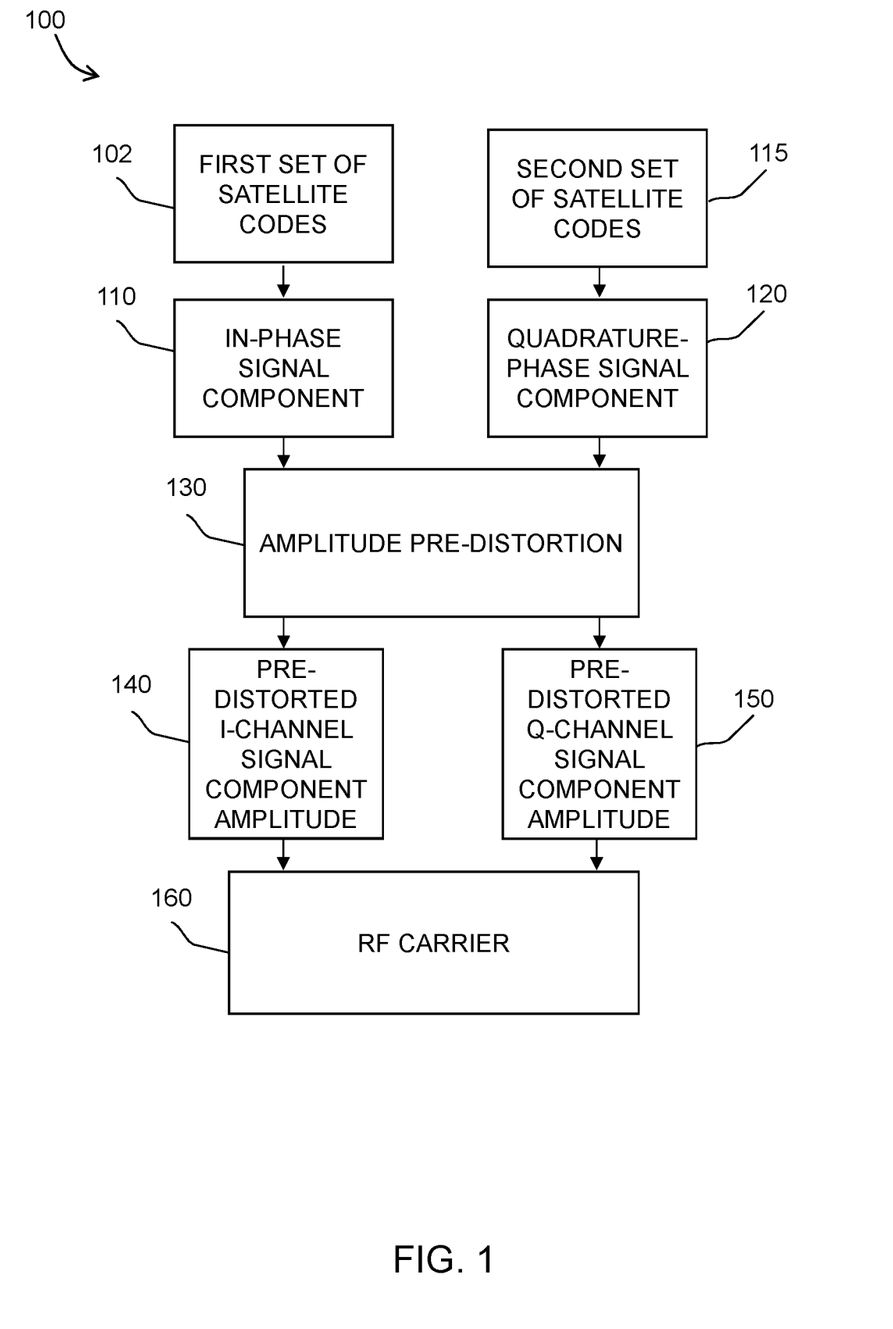
FIG. 1 is a schematic block diagram depicting an illustrative system for amplitude pre-distortion multiplexing for GPS satellite codes, according to aspects of the present teachings.

FIG. 1 is a schematic diagram depicting an illustrative system, generally indicated at 100, for amplitude pre-distortion code multiplexing, e.g. for GPS or other satellites. GPS space vehicles or satellites transmit satellite codes in the form of deterministic binary sequences for detection by GPS monitoring stations and by civilian or military GPS users. Each code is transmitted on one or more specified carrier frequencies at a specified bit-rate such that its sequence repeats after a specified time interval. For example, the coarse/acquisition (C/A) code of the GPS system is a sequence of 1023 bits that repeats every millisecond, and is used by GPS receivers to identify the time interval between transmission and receipt of the signal. Each GPS satellite transmits a unique sequence for each code so that GPS receivers can easily identify the satellite from which a given signal originated. GPS or other global navigation satellite systems may include a plurality of codes with different features or advantages, such as encryption or different sequence lengths or bit-rates.

The present disclosure is directed to systems and methods for combining or multiplexing satellite codes to facilitate transmission of multiple codes on the same carrier frequency band. Multiplexing the satellite codes entails selecting the fraction of the multiplexed transmission power that will be carried by each code, i.e., code power fractions. The selection of the code power fractions may be determined at least partially by performance standards of the GPS system, which require that certain codes be transmitted at or above specific power levels in order to ensure proper reception. A design goal for the multiplexing system may be to configure the code power fractions such that each code is transmitted with at least the required power level without excessively increasing the total power of the multiplexed signal. Additionally, it may be desirable to multiplex the codes as a constant envelope transmission, which allows an amplifier associated with the transmitter to operate in the compression gain region without signal distortion. The systems and methods of the present disclosure use amplitude pre-distortion for constant envelope transmission (APCET) to multiplex satellite codes with code power fractions optimized for these needs.

Exemplary system 100 includes multiplexing a first set of satellite codes 102 onto an in-phase channel (I-channel) to create a base-band in-phase signal component 110 and multiplexing a second set of satellite codes 115 onto a quadrature-phase channel (Q-channel) to create a base-band quadrature-phase signal component 120. A modulator or signal waveform generator combiner/modulator (WGCM) may be used to implement the multiplexing of the codes, the assignment of codes to the I-channel or Q-channel, and the selection of the respective amplitudes of base-band I-channel signal component 110 and the base-band Q-channel signal component 120. The multiplexing produces a linear combination of the first set of codes on the I-channel and a linear combination of the second set of codes on the Q-channel. For example, in the GPSIII system, the military (M) and precision (P) codes may be multiplexed on the I-channel, and the C/A, pilot (L1Cp), and data (L1Cd) codes may be multiplexed on the Q-channel.

Amplitude pre-distortion 130 is applied to one or both base-band signal components 110 and 120, such that after they are modulated onto an RF carrier, a power ratio of the modulated in-phase signal component 110 to the modulated quadrature-phase signal component 120 falls within a predetermined range. The power ratio may comprise an assigned pre-distorted I-channel signal component amplitude 140 and an assigned pre-distorted Q-channel signal component amplitude 150. The predetermined range of the power ratio may correspond to a constant-envelope transmission with a selected set of code power fractions. In one embodiment, the predetermined range of the power ratio corresponds to a unit-amplitude signal produced by projecting the linearly combined codes onto a unit circle, as discussed below with reference to FIG. 2. Pre-distortion 130 may also be configured to account for changes to the code power fractions that would otherwise occur due to data filtering effects or losses.

The pre-distorted base-band signal components are modulated onto an RF carrier 160 for transmission. The pre-distortion may enable the modulated signal components to be transmitted together as a constant-envelope signal.

Figure 2:
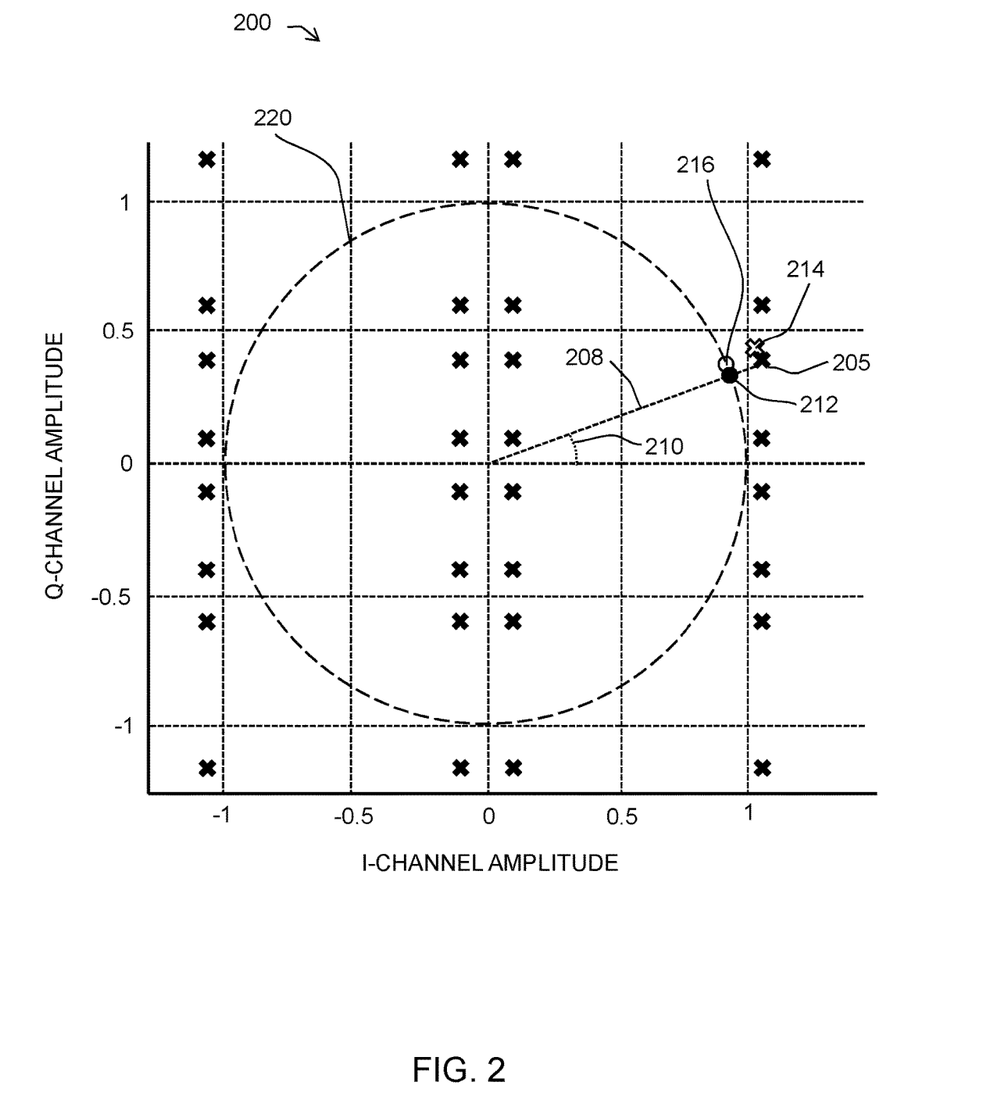
FIG. 2 is a graph of an illustrative phase constellation diagram representing satellite codes combined linearly and projected onto a unit circle before and after pre-distortion.

FIG. 2 depicts an example of pre-distortion and unit-circle projection for an illustrative linear combination of satellite codes represented by a phase-space constellation, generally indicated at 200. In this example, satellite codes are combined into the I-channel and Q-channel signal components as:

$$I=M+P \quad \text{(Eq. 1)}$$

$$Q=C/A+L1Cp+L1Cd \quad \text{(Eq. 2)}$$

Each code amplitude M, P, C/A, L1Cp, L1Cd may be scaled by a code power before being multiplexed; for clarity, these code powers are not included in Eqs. 1-2. The amplitude of each individual satellite code is either +1 or −1 at any given time. Therefore, if there are N codes, there are $2^N$ possible amplitudes for the combined I-channel and Q-channel signal. In the example of Eqs. 1-2, there are five codes and therefore $2^5=32$ combinations of binary code values, but other examples may have more codes or fewer codes. Each of the 32 linear combinations is represented as a linear combination point 205 in the (I,Q) plane depicted in FIG. 2, with the I-channel amplitude as the horizontal axis and the Q-channel amplitude as the vertical axis. Each constellation point 205 has an amplitude 208 associated with its radial distance from the origin of the (I,Q) plane and a phase angle 210 associated with its angular distance from the positive I-channel amplitude axis. A unit circle 220 having radius equal to unity is shown in FIG. 2. Projecting each point 205 in constellation 200 onto unit circle 220 produces a new set of unit-amplitude constellation points 212 with the same phase as the corresponding point 205. For clarity, only one point 212 is depicted in FIG. 2, corresponding to the projection of point 205 onto unit circle 220.

The constellation of unit-amplitude points 212 can be transmitted using constant envelope transmission because each point 212 has the same overall amplitude associated with its unit distance from the origin of the (I,Q) plane. Furthermore, each unit-amplitude point 212 has the same phase or angle 210 in the (I,Q) plane as the corresponding linear point 205, which facilitates its identification by a GPS receiver. However, the code power fractions of the satellite code signals multiplexed onto each of the I-channel and Q-channel signal components 110 and 120 may be distorted by the projection onto unit circle 220, such that the code power fractions associated with unit-amplitude points 212 are different from the code power fractions associated with linear combination points 205. This can result in inefficiencies such as excess overall power consumption or insufficient power of particular code signals.

The drawbacks mentioned above can be reduced or prevented by pre-distorting the I-channel and Q-channel signal components 110 and 120 before projecting them onto unit circle 220. The pre-distorted signal components can be represented as a pre-distorted phase constellation of points 214. Projecting the pre-distorted I-channel and Q-channel signal components onto unit circle 220 produces a constellation of optimized pre-distorted unit-amplitude points 216 representing optimized I-channel signal component amplitude 140 and optimized Q-channel signal component amplitude 150 having the same code power fractions as the undistorted linear combinations represented by points 205. The code power fractions of the signal represented by pre-distorted unit-amplitude points 216 may be equal to the code power fractions of the signal represented by the linear combination points 205 within a predetermined tolerance. The phase angle of each pre-distorted unit-amplitude point 216 may be equal to phase angle 210 within a predetermined tolerance.

Pre-distorting the I-channel and Q-channel signal components 110 and 120 may include altering an amplitude and/or a phase of the satellite codes multiplexed on the I-channel, the satellite codes multiplexed on the Q-channel, or both. The amplitudes or phases may be altered iteratively until the power ratio of the in-phase and quadrature-phase signal components falls within a predetermined range. In one embodiment, pre-distorting the I-channel and Q-channel signal components 110 and 120 includes calculating optimized pre-distorted I-channel and Q-channel amplitudes 140 and 150 by using a numerical method such as the Gauss-Seidel method to solve one or more systems of mathematical equations incorporating the desired code power fractions, the preference for constant envelope transmission, the preference for minimized overall transmission power, and possibly other constraints. In some embodiments, the pre-distortion also accounts for data filtering effects, code combining losses, and/or mechanization losses. These effects and losses may be accounted for by solving differential equations that model the filtering and loss behavior. The differential equations may be solved by a numerical method such as a Runge-Kutta method. In some examples, the differential equations are solved after each iteration of iterative alterations of the I-channel and Q-channel amplitudes.

In one embodiment, an estimation approach is used to pre-distort I-channel and Q-channel signal components 110 and 120. A first rough amplitude pre-distortion estimation may be accomplished by using the Gauss-Seidel method. The Gauss-Seidel method is an iterative technique for solving a system of n linear equations for unknowns represented by a variable x. The system of equations may be expressed as Ax=b, where A, x, and b are matrices:

$$A = \begin{bmatrix} a_{11} & a_{12} & \cdots & a_{1n} \\ a_{21} & a_{22} & \cdots & a_{2n} \\ \vdots & \vdots & \ddots & \vdots \\ a_{n1} & a_{n2} & \cdots & a_{nn} \end{bmatrix}, x = \begin{bmatrix} x_1 \\ x_2 \\ \vdots \\ x_n \end{bmatrix}, b = \begin{bmatrix} b_1 \\ b_2 \\ \vdots \\ b_n \end{bmatrix}.$$

The matrix A is decomposed into a lower triangular component $L_\theta$ and a strictly upper triangular component U, such that $A=L_\theta+U$, where $$L_\theta = \begin{bmatrix} a_{11} & 0 & \cdots & 0 \\ a_{21} & a_{22} & \cdots & 0 \\ \vdots & \vdots & \ddots & \vdots \\ a_{n1} & a_{n2} & \cdots & a_{nn} \end{bmatrix}, U = \begin{bmatrix} 0 & a_{12} & \cdots & a_{1n} \\ 0 & 0 & \cdots & a_{2n} \\ \vdots & \vdots & \ddots & \vdots \\ 0 & 0 & \cdots & 0 \end{bmatrix}.$$

The system of equations may be rewritten as a new matrix equation $L_\theta x = b - Ux$. The Gauss-Seidel method includes solving the system of equations iteratively by using, on the right-hand side of the new matrix equation, a value of x obtained in the previous iteration to produce, on the left-hand side of the new matrix equation, a new value for x. That is, the kth iteration of x is used to obtain the (k+1)th iteration of x, and the kth iteration is related to the (k+1)th iteration by the Gauss-Seidel iteration equation $L_\theta x^{k+1} = b - Ux^k$, where $x^k$ is the kth approximation or iteration of x and $x^{k+1}$ is the next or (k+1)th iteration of x. The elements $x_i^{k+1}$ of the matrix $x^{k+1}$ may be computed sequentially using a forward substitution wherein $$x_i^{k+1} = \frac{1}{a_{ii}} \left( b_i - \sum_{j=1}^{i-1} a_{ij} x_j^{k+1} - \sum_{j=i+1}^{n} a_{ij} x_j^k \right), i = 1, 2, \ldots, n.$$

The iteration procedure is continued until the changes made by the iteration converge to a desired result within a pre-determined tolerance and in accordance with constraints such as the desired code power fractions. A Runge-Kutta method may be implemented after each iteration of the Gauss-Seidel method to calculate the pre-distortion that will account for any filtering effects, code combining losses, and mechanization losses. Runge-Kutta methods numerically integrate ordinary differential equations by using a trial step at the midpoint of an interval to cancel out lower-order error terms.

Figure 3:
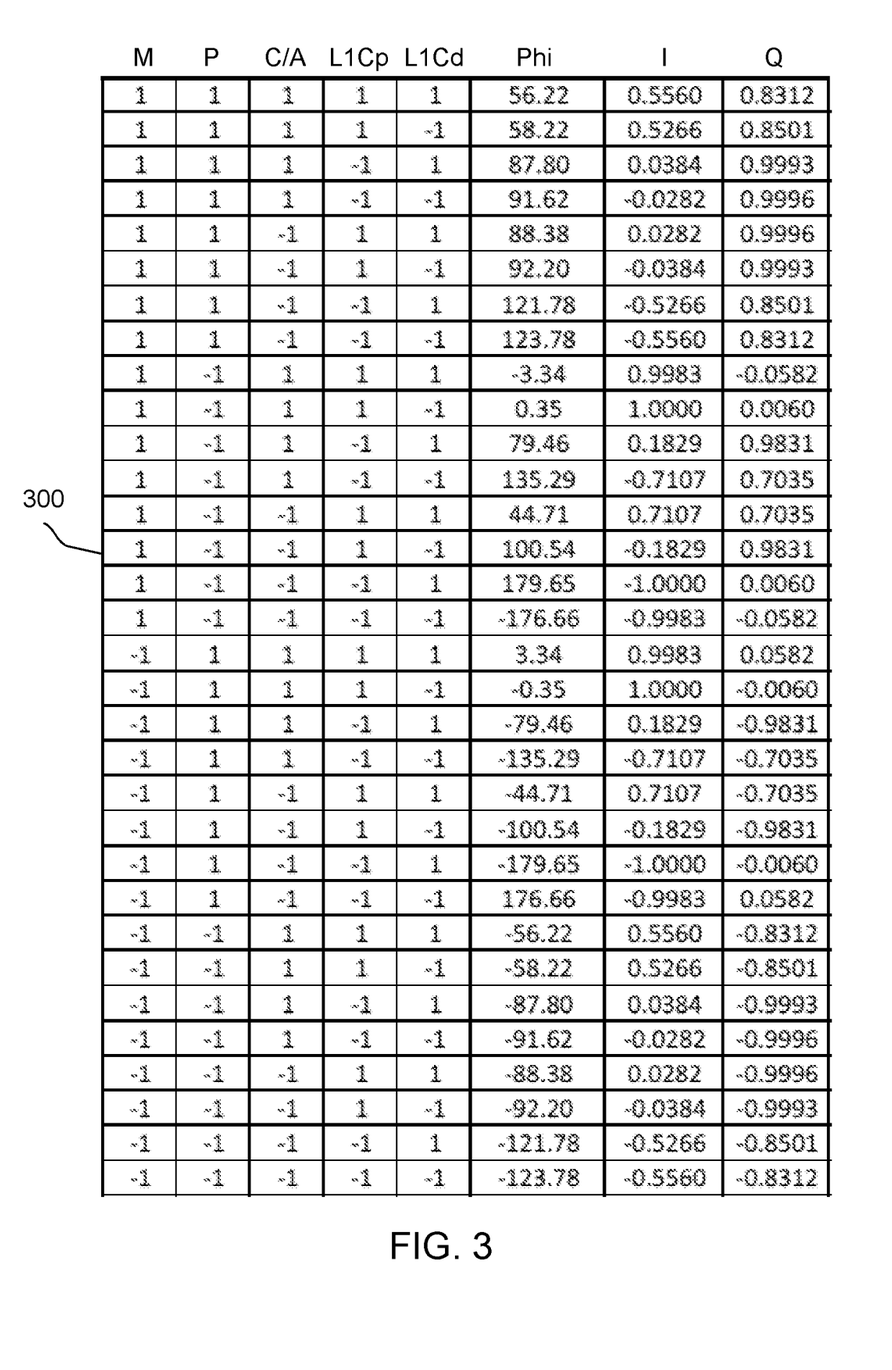
FIG. 3 is an illustrative lookup table for implementing amplitude pre-distortion multiplexing in an embodiment of the present teachings.

FIG. 3 depicts an illustrative lookup table 300 including the pre-distorted I-channel amplitude 140 and Q-channel amplitude 150 associated with each pre-distorted unit-amplitude constellation point 216. In some embodiments of the code multiplexing system described herein, a processor included in a GPS satellite is configured to access lookup table 300 to determine which amplitudes to transmit on the I-channel and Q-channel. For example, if the processor receives a stream of satellite code data bits M=1, P=1, C/A=1, L1Cp=1, L1Cd=1, then the processor will access lookup table 300 and identify the appropriate I-channel amplitude as 0.5560 and the appropriate Q-channel amplitude as 0.8312. Lookup table 300 may also provide information about the phase angle Phi associated with the appropriate I-channel and Q-channel amplitudes. Each possible combination of data bits is associated with an entry in lookup table 300. If there are five satellite codes, for example, then there are $2^5=32$ entries in lookup table 300. Lookup table 300 may include an array or matrix of data containing items that are searched. Lookup table 300 may be configured as key-value pairs, where the keys are the data items being searched and the values are either the actual data or pointers to where the data are located.

One or more lookup tables 300 may be customized for various code power fraction requirements (e.g., more power to the P code and less power to the C/A code). Lookup table 300 may be configured by ground control and transmitted to a GPS satellite. In some embodiments, each satellite is configured with a library of different tables 300. In some embodiments, the satellite processor creates lookup table 300 while the satellite is in use (i.e., in orbit). The processor may alter lookup table 300 responsive to instructions or information transmitted by ground control.

Figure 4:
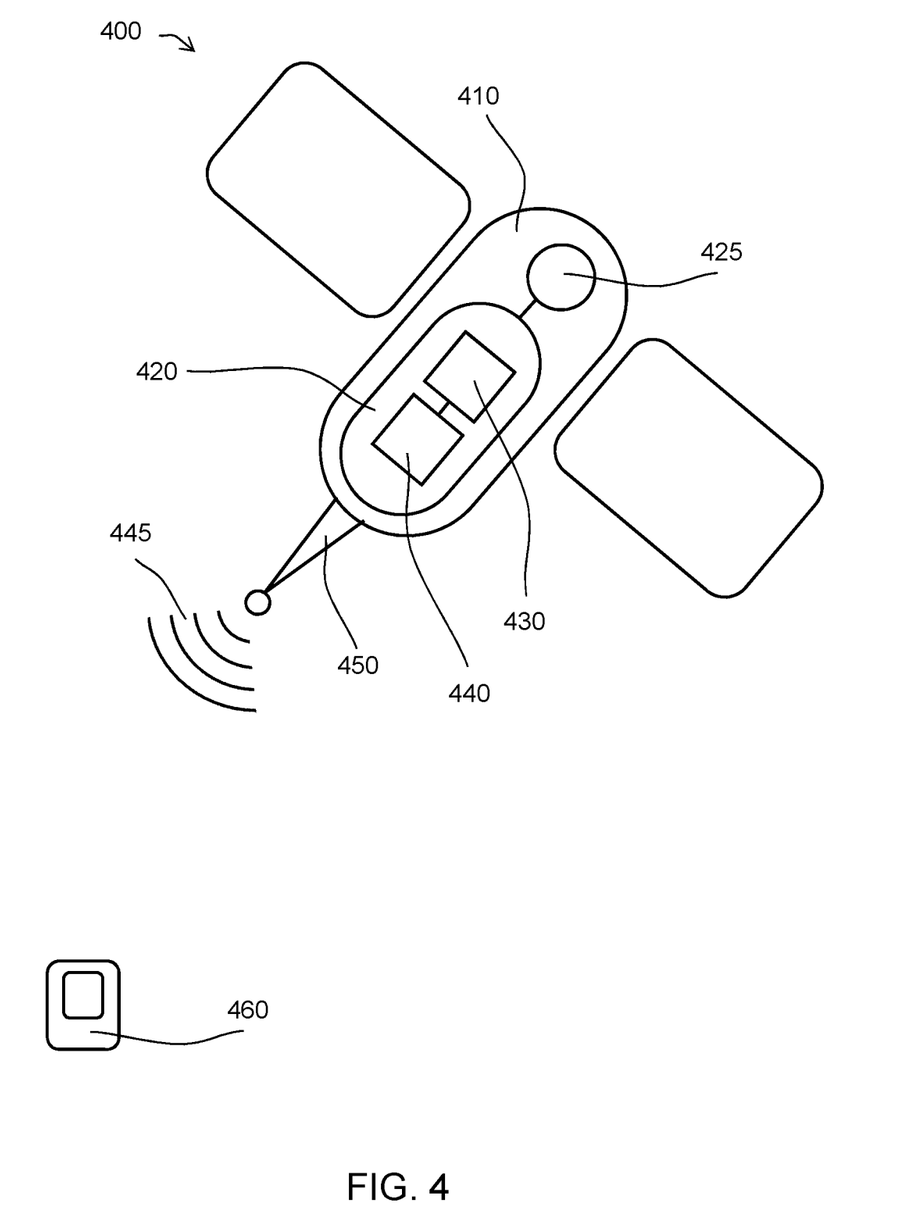
FIG. 4 is a schematic diagram of an illustrative GPS satellite system in which amplitude pre-distortion multiplexing may be used.

FIG. 4 depicts an illustrative GPS satellite 400 suitable for implementing amplitude pre-distortion system and methods for code multiplexing, according to aspects of the present teachings. GPS satellite 400 includes a body 410 configured to support one or more components of the satellite. Satellite 400 also includes a GPS signal payload 420 powered by a power source 425. Payload 420 includes a modulator 430 configured to modulate a first portion of data, using a first combination of two or more satellite codes, on an in-phase channel (I-channel), and to modulate a second portion of data, using a second combination of two or more satellite codes, on a quadrature-phase channel. In some examples, modulator 430 is a signal waveform generator combiner/modulator. Modulator 430 combines the modulated first and second portions of the data with a respective carrier signal to produce an in-phase signal component and a quadrature-phase signal component. The carrier signal may be an RF carrier signal.

GPS signal payload 420 further includes a processor 440 coupled to modulator 430. Processor 440 may include hardware, software, firmware and/or a combination thereof. Processor 440 is configured to pre-distort the data, before modulation of the data as described above, such that after modulation, a power ratio of the in-phase signal component to the quadrature-phase signal component falls within a predetermined range. In some embodiments, processor 440 pre-distorts the data by accessing a lookup table, as described above with reference to FIG. 3. The predetermined range of the power ratio may be chosen such that the in-phase signal component and the quadrature-phase signal component may be transmitted as a constant-envelope signal 445 by an antenna 450 coupled to processor 440. Constant-envelope signal 445 may be received and demodulated by a GPS receiver 460, which may use information from the signal and other transmissions from satellite 400 to determine the distance between receiver 460 and satellite 400.

Figure 5:
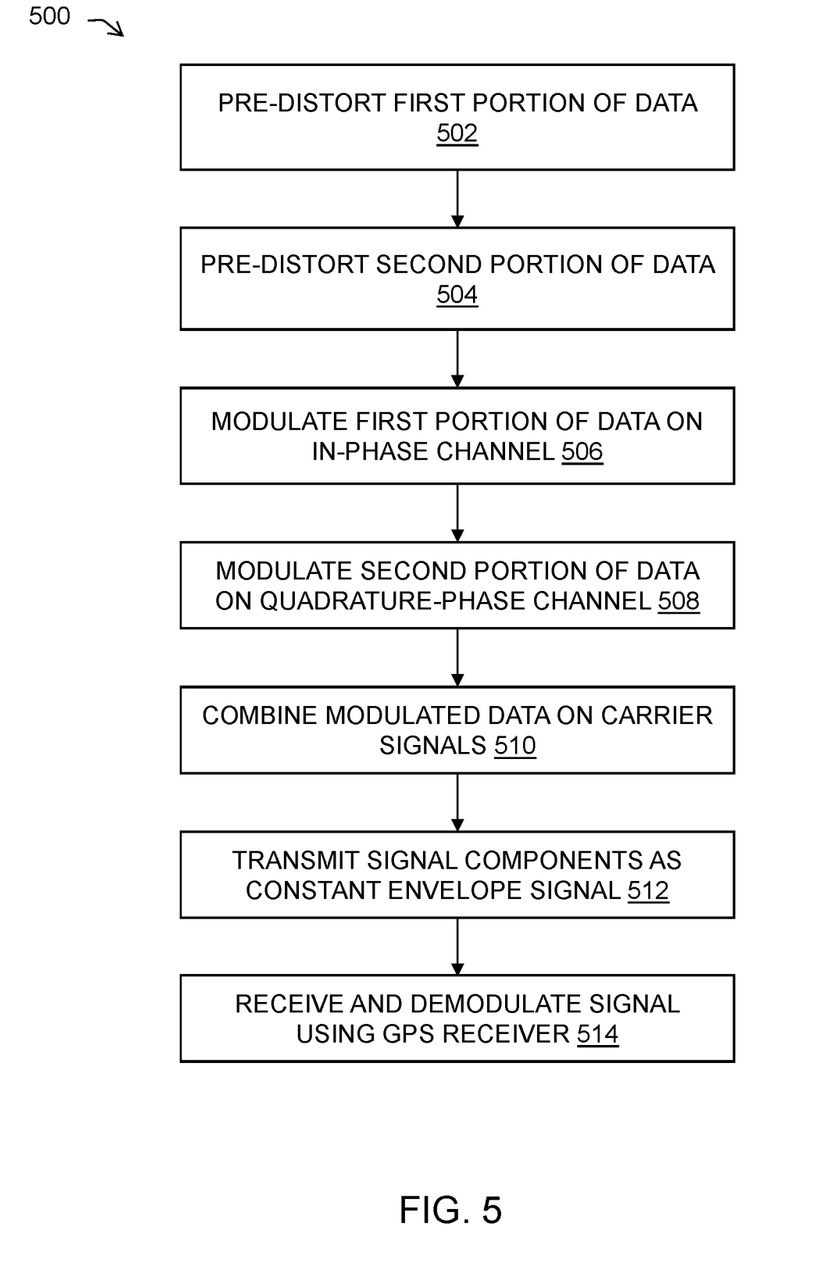
FIG. 5 is a flow diagram depicting an illustrative method for using amplitude pre-distortion multiplexing for GPS satellite codes.

FIG. 5 is a flow diagram illustrating steps performed in an illustrative method 500 of amplitude pre-distortion multiplexing for GPS satellite codes, and may not recite the complete process or all steps of the method. Although various steps of method 500 are described below and depicted in FIG. 5, the steps need not necessarily all be performed, and in some cases may be performed simultaneously or in a different order than the order shown.

At step 502, the method includes pre-distorting a first portion of data. At step 504, the method includes pre-distorting a second portion of data. The pre-distortion in steps 502 and 504 may be implemented by a processor on a GPS satellite. The data is pre-distorted such that a power ratio of the in-phase signal component and quadrature-phase signal component of step 510 (described below) falls within a predetermined range. Pre-distorting the data enables a constant envelope signal in step 512, as described below.

At step 506, the method includes modulating the pre-distorted first portion of data on an in-phase channel using a first combination of two or more satellite codes. At step 508, the method includes modulating the pre-distorted second portion of data on a quadrature-phase channel using a second combination of two or more satellite codes.

At step 510, the method includes combining the modulated first and second portions of data with a respective carrier signal to produce an in-phase signal component and a quadrature-phase signal component. The quadrature-phase signal component carrier signal may be created by shifting a phase of the in-phase signal component carrier signal by 90°. The carrier signals may be RF carrier signals.

At step 512, the method includes transmitting the in-phase signal component and quadrature-phase signal component as a constant envelope signal. The constant envelope signal may be transmitted by an antenna of a GPS satellite.

At step 514, the method includes receiving and demodulating the constant-envelope signal using a GPS receiver. Step 514 at least partially enables a user of the GPS receiver to use the GPS satellite codes and other information transmitted by the GPS satellite to determine the location of the GPS receiver.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. It is noted that various combinations and subcombinations of components have been described. Any of the components described or shown may be combined with any other components described or shown to create additional embodiments. In addition, explicit reference is hereby made to all inventions shown in the drawings.

What is claimed is:

1. A system comprising:
   a signal waveform generator combiner/modulator (WGCM) configured to:
   multiplex, on an in-phase channel (I-channel), a first set of two or more satellite codes of a plurality of satellite codes to create a base-band in-phase signal component,
   multiplex, on a quadrature-phase channel (Q-channel), a second set of two or more satellite codes of the plurality of satellite codes to create a base-band quadrature-phase signal component, and
   modulate the base-band in-phase signal component and the base-band quadrature-phase signal component onto an RF carrier; and
   a processor coupled to the WGCM and configured to pre-distort the base-band in-phase signal component and the base-band quadrature-phase signal component based on a respective desired power fraction for each satellite code of the plurality of satellite codes, such that after modulation of the in-phase and quadrature-phase signal components each satellite code has the respective desired power fraction for the satellite code.

2. The system of claim 1, further comprising an antenna coupled to the processor and configured to transmit the modulated in-phase signal component and the modulated quadrature-phase signal component as a constant-envelope signal.

3. The system of claim 1, wherein the processor is configured to pre-distort the base-band in-phase and quadrature-phase signal components by altering a phase and an amplitude of at least one of the first set of multiplexed satellite codes and the second set of multiplexed satellite codes.

4. The system of claim 3, wherein the processor is configured to alter the amplitude and phase iteratively.

5. The system of claim 1, wherein a power ratio of the modulated in-phase signal component to the modulated quadrature-phase signal component comprises an assigned I-channel amplitude and an assigned Q-channel amplitude.

6. The system of claim 5, wherein the processor is further configured to access a lookup table storing the assigned I-channel amplitude and the assigned Q-channel amplitude.

7. The system of claim 1, wherein the base-band in-phase signal component and the base-band quadrature-phase signal component produce a unity amplitude signal by projecting a phase space constellation of possible states of the plurality of satellite codes onto a unit circle after the base-band signal components have been pre-distorted.

8. A method of transmitting a GPS signal, comprising:
   modulating, on an in-phase channel (I-channel), a first portion of data using a first combination of two or more satellite codes of a plurality of satellite codes;
   modulating, on a quadrature-phase channel (Q-channel), a second portion of the data using a second combination of two or more satellite codes of the plurality of satellite codes;
   combining each of the modulated first and second portions of the data with a respective carrier signal to produce an in-phase signal component and a quadrature-phase signal component;
   before modulating the data, pre-distorting the data based on a respective desired power fraction for each satellite code of the plurality of satellite codes, such that each satellite code has the respective desired power fraction for the satellite code after modulating the data; and
   transmitting the in-phase signal component and the quadrature-phase signal component as a constant envelope signal.

9. The method of claim 8, further comprising receiving and demodulating the constant-envelope signal with a GPS receiver.

10. The method of claim 8, wherein pre-distorting the data includes altering an amplitude of at least one of the first portion of the data and the second portion of the data.

11. The method of claim 8, wherein a power ratio of the in-phase signal component to the quadrature-phase signal component comprises an assigned I-channel amplitude and an assigned Q-channel amplitude, and further comprising accessing a lookup table storing the assigned I-channel amplitude and the assigned Q-channel amplitude.

12. The method of claim 8, wherein producing the in-phase signal component and the quadrature-phase signal component includes producing a unity amplitude signal by projecting a phase space constellation of possible states of the plurality of satellite codes onto a unit circle after the data has been pre-distorted.

13. The method of claim 12, wherein pre-distorting the data includes pre-distorting the data to account for changes in power fractions of the satellite codes resulting from projecting the phase space constellation onto the unit circle, and also to account for data filtering effects.

14. A GPS satellite, comprising:
a satellite body;
a GPS signal payload including a modulator and a processor coupled to the modulator; and
a power source configured to provide power to the GPS signal payload;
wherein the modulator is configured to:
    modulate, on an in-phase channel (I-channel), a first portion of data using a first combination of two or more satellite codes of a plurality of satellite codes,
    modulate, on a quadrature-phase channel (Q-channel), a second portion of the data using a second combination of two or more satellite codes of the plurality of satellite codes, and
    combine each of the modulated first and second portions of the data with a respective carrier signal to produce an in-phase signal component and a quadrature-phase signal component; and
wherein the processor is configured to pre-distort the data, before modulation of the data, based on a respective desired power fraction for each satellite code of the plurality of satellite codes, such that each satellite code has the respective desired power fraction for the satellite code after modulation of the data.

15. The GPS satellite of claim 14, further comprising an antenna coupled to the processor and configured to transmit the in-phase signal component and the quadrature-phase signal component as a constant-envelope signal.

16. The GPS satellite of claim 14, wherein the processor is configured to pre-distort the data by altering an amplitude of at least one of the first portion of the data and the second portion of the data.

17. The GPS satellite of claim 16, wherein the processor is configured to alter the amplitude iteratively until a power ratio of the in-phase signal component to the quadrature-phase signal component falls within a predetermined range.

18. The GPS satellite of claim 14, wherein a power ratio of the in-phase signal component to the quadrature-phase signal component comprises an assigned I-channel amplitude and an assigned Q-channel amplitude, and the processor is further configured to access a lookup table storing the assigned I-channel amplitude and the assigned Q-channel amplitude.

19. The GPS satellite of claim 14, wherein the in-phase signal component and the quadrature-phase signal component produce a unity amplitude signal by projecting a phase space constellation of possible states of the plurality of satellite codes onto a unit circle after the data has been pre-distorted.

* * * * *